(12) United States Patent
Kimes

(10) Patent No.: US 9,872,513 B2
(45) Date of Patent: Jan. 23, 2018

(54) PROCESSES IN THE PREPARATION OF COCONUT MEAT BASED COMPOSITIONS AND FILMS

(71) Applicant: Priscila F. Kimes, Cebu (PH)

(72) Inventor: Priscila F. Kimes, Cebu (PH)

(*) Notice: Subject to any disclaimer, the term of this patent is extended or adjusted under 35 U.S.C. 154(b) by 0 days.

(21) Appl. No.: 14/902,687

(22) PCT Filed: Jun. 30, 2014

(86) PCT No.: PCT/PH2014/000014
§ 371 (c)(1),
(2) Date: Jan. 4, 2016

(87) PCT Pub. No.: WO2015/002553
PCT Pub. Date: Jan. 8, 2015

(65) Prior Publication Data
US 2016/0219908 A1 Aug. 4, 2016

(30) Foreign Application Priority Data

Jul. 1, 2013 (PH) ............................. 1-2013-00204
Feb. 27, 2014 (PH) ............................. 1-2014-00076

(51) Int. Cl.
*A23L 27/00* (2016.01)
*A23L 19/00* (2016.01)
*A23G 3/48* (2006.01)

(52) U.S. Cl.
CPC ................ *A23L 27/79* (2016.08); *A23G 3/48* (2013.01); *A23L 19/09* (2016.08)

(58) Field of Classification Search
CPC ............ A21D 8/02; A21D 10/04; A23L 19/09
See application file for complete search history.

(56) References Cited

U.S. PATENT DOCUMENTS

| | | |
|---|---|---|
| 3,899,606 A | 8/1975 | Forkner |
| 4,205,093 A | 5/1980 | Blake |
| 4,565,702 A | 1/1986 | Morley et al. |
| 4,631,837 A | 12/1986 | Magoon |
| 5,084,296 A | 1/1992 | Lugay et al. |
| 5,264,235 A | 11/1993 | Duckworth |
| 5,549,921 A | 8/1996 | Robinson et al. |
| 5,773,070 A * | 6/1998 | Kazemzadeh ........ B30B 11/243 426/516 |
| 5,853,836 A | 12/1998 | Zoss |
| 5,928,692 A | 7/1999 | Mayfield |
| 5,962,053 A | 10/1999 | Merritt, II |
| 6,027,758 A | 2/2000 | McHugh et al. |
| 6,083,582 A | 7/2000 | Chen et al. |
| 6,375,981 B1 | 4/2002 | Gilleland et al. |
| 6,596,298 B2 | 7/2003 | Leung et al. |
| 6,623,779 B1 | 9/2003 | Huxsoll et al. |
| 6,663,910 B2 | 12/2003 | Soumya et al. |
| 6,699,315 B2 | 3/2004 | Augello et al. |
| 8,048,466 B2 | 11/2011 | McHugh et al. |
| 2002/0015761 A1* | 2/2002 | Prosise .................. A23L 7/122 426/72 |
| 2002/0168460 A1 | 11/2002 | Soumya et al. |
| 2003/0224090 A1 | 12/2003 | Pearce et al. |
| 2004/0043134 A1 | 3/2004 | Corriveau et al. |
| 2013/0045315 A1* | 2/2013 | Succar ..................... A23L 2/02 426/519 |
| 2014/0377446 A1* | 12/2014 | Savarese .................. A23L 2/39 426/639 |

FOREIGN PATENT DOCUMENTS

GB 2318969 A * 5/1998 ........... A23C 11/103
PH 1/2010/000037 A 9/2013

OTHER PUBLICATIONS

Joy, "Coconut Wraps", url: http://thedeliciousrevolution.com/dessert/coconut-wraps/, archived online Apr. 19, 2012.*
Parks, S. "Strawberry Fruit Roll-Ups Recipe", url: http://www.seriouseats.com/recipes/2012/03/strawberry-fruit-roll-up-recipe.html, published online prior to Mar. 2, 2012.*
Reddy et al. "Nonthermal Sterilization of Green Coconut Water for Packaging", Journal of Food Quality, 30 (2007) pp. 466-480.*
Telesco et al. The Everything Canning and Preserving Book: All you need to know to enjoy natural, healthy foods year round, Simon and Schuster, May 18, 2009, retrieved from Google Books, 3 pages total, page numbers unavailable.*
International Search Report and Written Opinion dated Sep. 3, 2015, issued in corresponding International Application No. PCT/PH2014/000014 (9 pages).
The Coconut Mama, "Coconut Wraps Recipe"; Mar. 10, 2011 [online], [retrieved on Dec. 29, 2015]; Retrieved from Internet: <URL: http://thecoconutmama.com/coconut-wraps-recipe/> (5 pages).
Parker-Pope, "Cooking with Coconut Oil"; Mar. 2, 2011 [online], [retrived on Dec. 29, 2015]; Retrieved from the New York Times.com, Internet: <URL: http://well.blogs.nytimes.com/2011/03/02/cooking-with-coconut-oil/?_r=0> (2 pages).

* cited by examiner

Primary Examiner — Michele L Jacobson
(74) Attorney, Agent, or Firm — Osha Liang LLP

(57) ABSTRACT

A process for preparing fresh coconut meat based compositions and films, including its improvements and modifications, includes mainly of coconut meat wherein other fruit and vegetables are added as flavorings and enhancers. These coconut meat based compositions and films can be used as crepes, rolls, and or wraps, which are usually employed in wrapping any food such as fresh fruits, vegetables, salads, or cooked meat/fish, and any combination, after which are rolled, folded and eaten directly during meals or as snacks.

5 Claims, No Drawings

PROCESSES IN THE PREPARATION OF COCONUT MEAT BASED COMPOSITIONS AND FILMS

CROSS REFERENCE TO RELATED APPLICATIONS

This is a national stage application of PCT/PH2014/000014, filed on Jun. 30, 2014, which claims the priority of PH 1-2013-00204, filed on Jul. 1, 2013, and PH 1-2014-00076, filed on Feb. 27, 2014. This application claims the benefit and priority of these prior applications and incorporates their disclosures by reference in their entirety.

TECHNICAL FIELD OF INVENTION

This invention refers to the processes in the preparation of fresh coconut meat based compositions and films, including its improvements and modifications, comprising mainly of coconut meat wherein other fruit and vegetables are added as flavourings and enhancers. These coconut meat based compositions and films can be used as crepes, rolls, and or wraps, which are usually employed in wrapping any food such as fresh fruits, vegetables, salads, or cooked meat and/or vegetables, and any combination thereof, after which are rolled, folded and eaten directly during meals or as snacks.

DESCRIPTION

Background of the Invention

The fresh coconut meat based compositions which are produced into films are similar to spring rolls or "lumpia" wrappers of Chinese dim sum, or "tortilla" in Spanish meals which involved putting an ingredient material on a dough sheet of the spring roll or "lumpia" wrapper" or "tortilla", rolling up the dough sheet to wrap the ingredient material, except that no frying is necessary as this coconut meat based composition made into films can be eaten directly. Any food material and mixtures can be placed onto a portion of the surface area of the films, then rolled and or folded, then is conveniently ready for eating. Further, some examples of wrapped foods particularly popular in Japan and in the rest of Asian countries are the Japanese temaki sushi and onigiri/omusubi, the former is hand roll and cone and the latter is like a rice ball. In this example, the primary sheet product used to wrap sushi and onigiri/omusubi is "nori," an algae-based food made of seaweed of the genus *Porphyra* which has been processed and dried into sheets. Although such seaweed based wrap for food is popular, many do not find the taste or texture of seaweed attractive and appealing, especially children.

Eating healthy foods such as fruits and vegetables has been a universal campaign. Thus there is always a challenge to prepare these foods in such a way that they are attractive and appealing to people of all ages, and at the same time have the desired variety and convenience added to it. Foods, including handheld foods, snack foods, and convenience foods, prepared with a food wrapper made primarily of a delicious and nutritious fruit and or vegetable itself can address these challenges.

The preparation of edible fruit and vegetable foods has been reported already around the world. Fruits and vegetable films and its uses have been reported by McHugh et al. in U.S. Pat. No. 8,048,466. Intermediate-moisture formed food products made from partially dehydrated fruit or vegetable pieces and a gelled matrix have been reported by Huxsoll et al. in U.S. Pat. No. 6,623,779. Seventy to 100% fruit and vegetable bars produced using twin screw extrusion have been reported by McHugh et al. in U.S. Pat. No. 6,027,758.

Fruit-based edible wraps and vegetable-based edible wraps which may use lipids in the formulation have been reported by Senesi and McHugh (2002), "Film e coperture eduli con matrici a base di frutta," *Industrie Alimentari* XLI dicembre. 1289-1294; McHugh and Senesi (2000) "Apple Wraps: A Novel Method to Improve the Quality and Extend the Shelf Life of Fresh-Cut Apples," *Journal of Food Science* 65(3): 480-485; McHugh, "Fruit and Vegetable Edible Wraps," *Asian Food Tech.* 2(4): 18-23 (2001); McHugh, "Edible Packaging," *Resource Magazine*, Nov. 7-8 (2001); McHugh et al. (2004), "Fruit and Vegetable Wraps: Application to Partially Dehydrated Apple Pieces," In "Quality of Fresh and Processed Foods" edited by F. Shahidi, A. Spanier, C-T. Ho and T. Braggins, Kluwer Academics/Plenum Publishing, Chapter 21, pp. 289-299; McHugh et al. (1998) "Apple-based Edible Wraps Extend the Shelf Life of Fresh Cut Apples," Abstract #20A-33, EFT Annual Meeting Book of Abstracts.

Fruit puree edible films and coatings and their properties have been reported by McHugh et al., "Fruit Puree-Based Edible Films and Coatings." (1997), In Chemistry of Novel Foods, Spanier, A., Tamura, M. and Mills, O. (Eds.), Allured Publishing Corporation, Carol Stream, III. pp. 167-198; McHugh et al. (1996), "Permeability Properties of Fruit Puree Edible Films," *Journal of Food Science* 61(1): 88-91.

Jerky, leather, or rope-type products for human or pet foods which contain a fruit or vegetable ingredient have been reported. See U.S. Pat. Nos. 5,853,836; 5,773,070; 5,549,921; 5,084,296; 4,631,837; 4,565,702; 4,205,093.

Gelled food compositions are reported in U.S. patent application No. 2002/0168460 and U.S. Pat. No. 6,663,910. Snack foods, edible film snacks, or rolled edible films have been reported in U.S. patent application Nos. 2003/0224090 and 2004/0043134 and U.S. Pat. Nos. 6,596,298; 5,962,053; 5,264,235.

Edible films for use as coating or gel capsule application which do not contain a fruit or vegetable ingredient have been reported. See U.S. Pat. Nos. 6,699,315; 6,375,981; 6,083,582; 5,928,692.

The object of this invention is to provide a fruit, vegetable or fruit and vegetable-based compositions and films which have the properties to serve as nutritious, delicious, and appealing alternates or substitutes for all other compositions or films reported so far. In particular, this invention pertains to the fresh coconut meat based compositions and films and its improved processes in the preparation thereof, which is comprised mainly of coconut meat wherein other fruit and vegetables are added as flavourings and enhancers. Further, the invention described herein pertains to the improved processes for the production of coconut meat based compositions and films, which can desirably be eaten directly, baked, steamed, or fried, and can remain fresh for up to twelve (12) months or longer, without chemical preservatives.

SUMMARY OF THE INVENTION

The object of this invention is to provide an alternative to known spring rolls or tortillas or lumpia wrappers, fruit films, vegetable films, fruit and vegetable films, fresh crepe or roll or wrap for food and as food, which have the desired properties to serve as nutritious, delicious, and appealing food alternate.

An exemplary embodiment of the present invention relates to a composition comprising at least 90% coconut meat and at most 10% coconut water, preferably derived from a fresh and young coconut. The said composition may be combined with other fruits and vegetables to serve as nutrition, texture, and flavour enhancers. The said compositions makes it suitable in making films having the thinness, strength, flexibility, and crispness to serve as alternates or substitutes for other food-based films, which are useful for wrapping around a combination and a plurality of foods, and can be employed to provide wrapped foods, such as fruit, vegetable, meat, or any combination thereof, the desired variety, nutrition, appeal, taste and convenience.

More specifically, the present invention pertains to a composition made into a monolayer film comprising of at the minimum 90% fresh and young coconut meat calculated on a percent by weight basis, and wherein the film has a dry film thickness in the range from about 1.0 to about 3.0 millimeter, more preferably from about 1.5 mm to about 2.5 mm, most preferably at about 2.0 mm, a moisture content in the range from about 8 to about 10%, and a water activity in the range from about 0.45 to about 0.55. Alternately, virgin coconut oil and or fruit polyphenolic extract in the amounts within the range from 0.05% to about 0.1% each, calculated on a percent by weight basis. In another alternative, virgin coconut oil is added in the amount within the range from 0.05% to about 0.2% and up to 1.0% to 5.0% calculated on a percent by weight basis. These components are added to enhance the flavors, textures, nutritional content and longer shelf-life of the coconut meat based compositions which are made into films.

Alternatively, other fruits, vegetables, and spices, and or any combination thereof can be added to the fresh coconut meat based compositions and films in the amounts within the range from about 0.1% to about 0.4% each or 1.0% to 2.0% depending on the variety to enhance the flavors, textures, nutritional content, and to add more variety/flavor to the coconut meat based compositions which are made into films.

The coconut meat based films can be packaged in sheets, rolls, or any convenient form. Alternatively, the films can be packed by arranging them in sheets in between food-grade paper sheets to keep its desired dryness, flexibility and crispness. The films or film products are packaged so as to maintain the desired film water activity and moisture content, for example, in food-grade moisture barrier bags or other containers or in oxygen and moisture barrier bags and food-grade containers. A desiccant can be incorporated into a film package or film product package to absorb moisture during storage and maintain the desired food film properties. Alternatively, the films can be directly used for preparing products and directly eaten without frying or cooking.

The films can be used for wrapping around foods to provide a wide range of healthy, nutritious, delicious, appealing, ready-to-eat and convenient foods, during meal time and snack time, for example. The films can also be applied between foods. Since the method of producing the composition provides a way to combine any fruit, vegetable and or spices, the films have the additional appeal and variety according to individual preferences.

The shelf life of the product referred to herein can reach about twelve (12) months, when packaged and stored at the specified conditions so as not to alter its desired film properties of moisture content, water activity, crispness and dryness. With such desirable shelf life, the products may be prepared for immediate consumption or for future consumption.

The following advantages can be observed of the coconut meat based compositions and films, which is the object of this invention. The films when produced as described herein provide the important and unique characteristics of thinness, strength, flexibility, crispness, and dryness to serve as alternative or substitute for other food-based compositions and films, while providing the other important properties of food nowadays which should be healthy, nutritious, delicious, appealing and tasty. Notwithstanding these advantages, the products, which are comprised of fruits and vegetables, also have longer shelf lives, provide a wide range of variety and texture, are convenient and ready-to-eat. The provision of products made from fruits and vegetables can increase consumption of fruits and vegetables and afford consumers to meet their daily dietary requirements, thus help them achieve a more balanced and nutritious diet. A more specific advantage of the invention is the provision of attractive nutritious low carbohydrate, low calorie product which can contribute in addressing the global problem of people's increasing obesity.

This invention also pertains to the improved methods in making the fresh coconut meat based compositions and films. Other important objects and advantages of the invention may also become apparent from the ensuing detailed description.

The Invention

The present invention pertains to compositions and films, the processes and the modifications of such processes in the preparation thereof, comprising mainly of the coconut meat and coconut water, combined with other fruits and vegetables to serve as nutrition, texture and flavour enhancers as well as extend its shelf-life. These compositions and films have the thinness, strength, flexibility, and crispness to serve as alternates or substitutes for other food-based films, which are useful for wrapping around a combination and a plurality of foods, and can be employed to provide wrapped foods, such as fruit, vegetable, meat, fish or any combination thereof, the desired variety, nutrition, appeal, taste and convenience.

To promote better understanding and appreciation of the object of this invention, the following general definitions are included.

A film is a thin layer of material and when the film is edible, it is made of a thin layer of edible material. Edible films are pre-formed into solid sheets which can then be applied on, around or between foods, food components or ingredients. As an object of this invention, a thin single layer of film is made from a composition comprising mainly of coconut meat, preferably the fresh and young puree.

The fresh and young coconut meat puree refers to a paste or liquid suspension usually made by grinding or blending coconut meat in combination with other fruit and or vegetable ingredients, wherein the fresh coconut water obtained from the coconut fruit is also mixed in. The coconut puree is prepared from whole flesh. The puree is then the intermediate product that can be employed for processing into different final products. Purees can be heat treated, aseptically or otherwise, but do not necessarily have to be heat treated. In this invention, the coconut meat "puree" is meant to refer to both heat and non-heat treated whole coconut meat which have been mechanically transformed, such as under a screening or pulping device, into viscous slurries. Thus, this comminuted material can be distinguished from individual discrete pieces of intact fruit or vegetable flesh. Purees can range in moisture from 4% in dried form to 98% in dilute form.

Percent ingredient is expressed as [(weight of ingredient/total weight of formulation)×100].

Percent ingredient expressed on a percent by weight basis of a formulation is calculated as [(weight of the ingredient)/(sum of (weight of each ingredient in the formulation))×100]. Calculations are illustrated in the following examples below.

Water Activity is defined as the amount of unbound, free water in a system available to support biological and chemical reactions. Water activity is a concept that differs from that of absolute water content of a particular food. Some foods may have high levels of total water content while at the same time possess low water activity. The equation for water activity is: $A_w = VP/VP_0$, where VP is the partial vapor pressure of the food at temperature T and $VP_0$ is the saturation vapor pressure of pure water at T. This ratio provides the amount of free water present in the food expressed as the equilibrium state of the unbound water content in relation to the vapor pressure of the surrounding environment in which the food is stored under conditions of room temperature and atmospheric pressure.

Moisture content is determined by using the AOAC (Association of Analytical Communities) official method 22.012. It can also be determined by other methods as known in the art.

In one of the main embodiments of the present invention, a method of preparing the food composition is described comprising the steps:
(a) grinding the coconut meat,
(b) mixing the ground coconut meat in (a) with coconut water, and
(c) drying.

Preferably, the said method of preparing the food composition further comprises the step of sieving the mixed coconut meat and coconut water in (b) to form a more homogeneous puree or batter before the drying step. More preferably, the drying step is done until the moisture content of the mixture ranges from 8% to 10%. This is done for two (2) to five (5) hours at a temperature range of 35-85° C., preferably 48-65° C., most preferably 50-60° C.

In another embodiment of the present invention, a method of preparing an edible film comprises the steps:
(a) grinding coconut meat,
(b) mixing the ground coconut meat in (a) with coconut water,
(c) sieving the said mixture in step (b) to achieve a homogenous puree or butter,
(d) spreading the resulting sieved mixture in a drying sheet, and
(e) drying the spread mixture up to a moisture content ranging from 8% to 10%.

Preferably, the drying step is done for two (2) to five (5) hours at a temperature range of 35-85° C., preferably 48-65° C., and most preferably 50-60° C. The raw ingredients used in the above methods preferably comprise the following ratios:
(a) 88-97 wt % coconut meat, and
(b) 3-12 wt % coconut water.

More preferably, the coconut meat and coconut water used in the above methods are derived from fresh and young coconuts with good coconut meat and more coconut water.

Alternatively, other fruits, vegetables, and spices, and or any combination thereof can be added to the raw ingredients in a combined amount not exceeding 2 wt % of the total ingredients. These additives enhance the flavors, textures, nutritional content, and add more variety to the coconut meat based compositions especially those which are made into films.

Another embodiment of the present invention pertains to a food composition obtainable from any of the methods disclosed above. The said resulting food composition and or film comprises:
(a) at least 90 wt % coconut meat, and
(b) at most 10 wt % coconut water.

Alternatively, the said composition obtainable from any of the methods disclosed above comprises:
(a) at least 88 wt % coconut meat,
(b) at most 10 wt % coconut water, and
(c) at most 2 wt % additives.

Preferably, any of the said obtainable compositions disclosed above has 8-10% moisture content and more preferably having a water activity of 0.45-0.55.

In another embodiment of the present invention, any of the obtainable compositions disclosed above is in the form of an edible film. Preferably, the said edible film is monolayer. Most preferably, the dry thickness of the said edible film is in the range of 1.0-1.5 millimeter. The said edible film have the thinness, strength, flexibility, and crispness to serve as alternate or substitute for other food-based films, which are useful for wrapping around a combination and a plurality of foods, and can be employed to provide wrapped foods, such as fruit, vegetable, meat, or any combination thereof, the desired variety, nutrition, appeal, taste and convenience.

In a more specific embodiment of the invention, the methods in the preparation of the coconut meat based compositions and films are described in more detail although are intended only to further illustrate the invention and are not intended to limit the scope of the invention which is defined by the claims. The first step consists of harvesting carefully the coconut fruit, preferably fresh and young, which should have the right maturity, ripeness, and texture of the coconut meat. Other fruit, vegetables, spices and herbs which are used in the process are also harvested and chosen carefully to have its desired maturity, texture, color and ripeness.

The coconut meat and its coconut water are collected separately and stored in clean containers. The coconut meat is reduced to small pieces by methods already known in the art such as chopping, grating, and grinding. The smaller pieces of coconut meat are then blended with the right amount of coconut water to obtain a coconut meat puree. The puree is preferably blended with the right amount of additional ingredients, fruits and or vegetables, herbs and spices to obtain the final product mixture. Please see further the examples below for more detailed description of the combinations of these fruits and vegetables. Further, the mixture is then sieved using a stainless steel strainer preferably with about 100 to 200 mesh screen. The resulting homogenous puree or butter is then spread immediately on high-temperature resistant drying sheets using a template with a dimension of about 20 cm×20 cm. The dimensions of the drying sheet template can be modified further to 25 cm×25 cm, 28 cm×28 cm, or 40 cm×40 cm, to allow a variety of sizes for different applications. The filled drying sheets are then placed in a dryer to dry the film at the desired moisture content. A set of mechanical and solar dryers is employed in the drying process to save on fuel and energy. The drying process takes about two (2) to five (5) hours at a temperature range from 35° C. to 85° C., preferably from 48° C.-65° C., most preferably from 50-60° C., until the desired moisture content within the range from 8% to about 10% is attained. Along with the moisture content, the desired strength, flexibility and crispness of the dried films are tested before harvesting of the dried films. After drying, the films are then allowed to cool down to a temperature range of about 18° C. to 24° C. for about 5-10 minutes. When cooled, the dried films are collected and weighed. Then, they are packed and sealed properly to further improve its shelf life.

The films produced in this invention comprise the following properties: a monolayer film comprising of at the minimum 90% fresh and young coconut meat calculated on a percent by weight basis, a dry film thickness in the range from about 1.0 to about 3.0 millimeter, more preferably at about 1.5 mm to about 2.5 mm, most preferably at about 2.0 mm, a moisture content in the range from about 8 to about 10%, and a water activity in the range from about 0.45 to about 0.55.

The amount of coconut water added to the mixture, and thereby the percent moisture of the starting puree can vary depending on the maturity of the fresh coconut meat being used. A base puree may be dried or diluted as needed to obtain the desired percentages. Other ingredients may be incorporated into the wet film formulation in an amount sufficient to obtain a desired characteristic while maintaining the thinness, strength, flexibility, and crispness of the final film produced by the formulation. Without being limiting, examples of other ingredients include flavor ingredients or enhancers and color sources or texture enhancers. The other ingredients may be added in an amount to provide flexibility, strength, flavor, color or other advantageous property; however, the concentration should not be so high that the added ingredient substantially separates out of the wet film formulation. Preferably the other fruit, vegetable and herbs and spices are added in the range from 0.1% to about 0.4% each calculated on a percent by weight basis. The total percentage of all other ingredients is calculated as a percent by weight basis in combination with the other main ingredients. Thus, the combination of all other ingredients cannot be more than 2% calculated on a percent by weight basis.

In a more specific embodiment, the present invention can have a composition wherein virgin coconut oil and or fruit polyphenolic extract are added in the amounts within the range from 0.05% to about 0.1% each, calculated on a percent by weight basis. In another alternative, only virgin coconut oil is added in the amount within the range from 0.05% to about 0.2%, and 1.0% to 5.0% calculated on a percent by weight basis. These components are added to enhance the flavors, textures, nutritional content and extend the shelf-life of the coconut meat based compositions which are made into films.

In general, the fresh and young coconut meat comprises at least 90% of the dry film formulation and the coconut water comprises at most 10% of the dry film formulation. The other ingredients such as flavor or color or texture enhancers are combined from a range within 0.1% to about 2.0% each, so that the resulting dry film would be comprised of at least 90% of the basic ingredients.

Drying may be carried out as needed to obtain the desired dryness by procedures already known in the art, including solar and or mechanical dehydrator and the like. Additional drying steps or a combination of different drying systems may be carried out as desired.

In another embodiment of the invention, the modified methods in the preparation of the coconut meat based compositions and films are described in more detail. The first step consists of harvesting carefully the fresh and young coconut fruit, which should have the right maturity, ripeness, and texture of the coconut meat. Other fruit, vegetables, spices and herbs which are used in the process are also harvested and chosen carefully to have its desired maturity, texture, color and ripeness. It is important that the harvesting and dehusking of young coconut are done on-site, where the actual processing can proceed immediately.

The fresh and young coconut meat and its coconut water are collected separately and stored in clean containers. The coconut water is further filtered in a 3-stage microfiltration system with 0.1-5 micron filters in order to eliminate unnecessary sediments and to disinfect the coconut water.

In another embodiment of this invention, the process of coconut meat collection and storage is modified by placing the harvested coconut meat in a blast-freezer, also known as contact-freezer, prior to use in order to prevent the onset of natural fermentation, which can lead to product spoilage. Alternatively, the coconut meat is then chopped and immediately blended with the right amount of filtered coconut water to obtain a coconut meat puree. The puree is further blended with the right amount of additional ingredients, fruits and or vegetables, herbs and spices to obtain the final product mixture. The blending process is done in approximately 6-8 minutes only to reduce operating costs.

Further, the mixture is then sieved using a stainless steel strainer with about 100 to 200 mesh screen. The resulting homogenous puree or batter is then spread immediately on high-temperature resistant drying sheets using a template with a dimension of about 20 cm×20 cm. The dimensions of the drying sheet template can be modified further to 25 cm×25 cm, 28 cm×28 cm, or 40 cm×40 cm, to allow a variety of sizes for different applications. The filled drying sheets are then placed in a dryer to dehydrate or dry the film at the desired moisture content. A set of mechanical and solar dryers is employed in the drying process to save on fuel and energy. The drying process takes about two (2) to five (5) hours at a temperature range from 35° C. to 85° C., preferably from 48° C.-65° C., most preferably from 50-60° C., until the desired moisture content within the range from 8% to about 10% is attained.

Along with the moisture content, the desired strength, flexibility and crispness of the dried films are tested before harvesting of the dried films. After drying, the films are then allowed to cool down to a temperature range of about 18° C. to 24° C. for about 5-10 minutes. When cooled, the dried films are collected, weighed, packed and sealed properly.

In the embodiment of this invention, the drying process is afforded careful attention and modified with the object of reducing the energy costs during the drying process and obtaining the most desirable properties of the coconut film product. Four sources of energy are considered in the drying process, namely: liquefied petroleum gas (LPG), electrical heat, solar energy, biomass or other alternative renewable energy source. In order to achieve the most desirable properties of the coconut film product, these are initially dried at 80-85° C. for about 30-60 minutes, then decreased to 70-80 C for about 30-60 minutes, then 60-70 C for about 30-60 minutes in mechanical dryer with LPG or electrical heat as energy source. Then, the coconut film product is transferred to a solar dryer in which the drying temperature is ranging from 45-55° C. for about one hour until the desired moisture content within the range from 8% to about 10% is attained. Along with the moisture content, the desired strength, flexibility and crispness of the dried films are tested before harvesting of the dried films. After drying, the films are then allowed to cool down to a temperature range of about 18° C. to 24° C. for about 5-10 minutes. When cooled, the dried films are collected, weighed, packed and sealed properly.

In another embodiment of this invention, a step may be added prior to the drying operations disclosed above in order to increase the drying capacity and or hasten the drying process of the food composition without incurring substantial additional drying costs. The provision of a walk-in warm chamber whereby room temperature is set in the range from 45-50° C., more preferably 46-49° C., and most preferably at 47-48° C., wherein the food compositions spread on drying sheets are arranged and set aside for a few minutes until the ideal moisture content is attained, before the series of post-drying operations will start.

In another embodiment of this invention, the preparation of the coconut film product is done by modifying the formula of the mixture of ingredients in such a way as to eliminate the salt, which results to a much healthier coconut film products with higher moisture content of about 10-13.5% and water activity of about 0.55 to 0.625 at the same drying conditions described above. Thus, to achieve the same moisture content of about or less than 10% and water activity of about 0.55, the total drying time of the coconut film product without salt, is increased to about 30 minutes.

In another embodiment of the invention, the preparation of the coconut film product is modified to increase the protein and fiber contents and reduce the carbohydrate content of the final product, by adding fresh egg white into the mixture of coconut puree batter, in a range of 4-7% based on the wet formula. Alternatively, powdered egg white or xanthan gum can be used instead of the fresh egg white. The final product is referred to as "high-protein" and "high-fiber" coconut film or wrap.

In another embodiment of this invention, the preparation of the coconut film product is modified to increase the medium-chain triglyceride (MCT) content of the product which results in an increase in good or beneficial fat content of the product. This is implemented by doubling the dosage of the unrefined virgin coconut oil added into the coconut puree and/or doubling the dosage of the fresh young (macapuno) coconut added into the coconut puree or batter. In this modified formula, the ingredients also prevent the formation of bubbles of the coconut puree, which leads in the formation of undesirable holes in the coconut film. The MCTs are known to be anti-fungal and anti-bacterial agents. Including this as ingredient in the coconut film also results in a longer shelf life of the coconut film product from nine (9) months to about twelve (12) months.

In another embodiment of the invention, the thickness of the drying sheet template is increased from a range of 1.0-1.5 mm to 1.0-3.0 mm, more specifically to about 1.5 mm to 2.5 mm, more specifically to about 2.0 mm, to provide an enhanced stability of the coconut film or wrap product itself.

EXAMPLES

The following examples are intended only to further illustrate the invention and are not intended to limit the scope of the invention which is defined by the claims.

Example 1. Coconut Meat Based Composition

The following example describes the formulation of the coconut meat based compositions made into films, as the object of the invention. Table 1 shows the important ingredients in the production of coconut meat based composition and film. In this example, the basic ingredient is the fresh and young coconut meat. In the preparation of the puree, coconut water is added during blending within the range from 500 g to about 1,500 g so as to promote homogeneity of the mixture and achieve the desired texture of the resulting puree. Furthermore, virgin coconut oil and mango poly- phenolic extract (obtained from a local supplier) are also added as flavor, texture and shelf-life enhancers.

TABLE 1

Coconut meat based composition

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Coconut water | 500-1500 | 8-10% |

The typical nutritional fact, which is shown as an example and does not suggest to limit the embodiments of the present invention, for the dried coconut composition or film is shown in table 2 below.

Examples 3-16. Coconut Meat Based Composition Expressed in Other Varieties

The following examples describe the formulation of the coconut meat based compositions made into films, as the object of the invention, with additional ingredients such as fruits and vegetables to enhance flavors and textures and to add more variety of the food film. Tables 3-16 show the important ingredients in the production of coconut meat based composition and film and the additional ingredients.

TABLE 2

Typical Nutrition Facts for the dried coconut composition.

| Serving size = 1 wrap Servings per container = 7 wraps Amount per serving | | 14 g | |
|---|---|---|---|
| Calories | 70 | Calories from fat 45 | |
| | | % Daily Value* | |
| Total Fat | 5 g | 8% | |
| Saturated Fat | 4.5 g | 22% | |
| Trans Fat | 0 g | | |
| Cholesterol | 0 g | 0% | |
| Sodium | 10 g | 0% | |
| Potassium | 290 mg | 8% | |
| Total Carbohydrate | 6 g | 2% | |
| Dietary Fiber | 2 g | | |
| Soluble Fiber | 1 g | | |
| Sugars | 3 g | | |
| Protein | 1 g | | |
| Vitamin A | | 0% | |
| Calcium | | 2% | |
| Vitamin C | | 0% | |
| Iron | | 2% | |

*Percent daily values are based on a 2,000 calorie diet.

TABLE 3

Coconut meat based composition with *Moringa* flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| *Moringa oleifera* leaf powder | 50 | |
| Onion leaf powder | 30 | |
| Onion bulb powder | 30 | |
| Ginger powder | 15 | |
| Coconut water | 500-1500 | 8-10% |

TABLE 4

Coconut meat based composition with Chocolate flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Chocolate or cacao powder | 50-100 | |
| Coconut water | 500-1500 | 8-10% |

TABLE 5

Coconut meat based composition with Mango flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Mango (kernel/flesh) powder | 50-100 | |
| Coconut water | 500-1500 | 8-10% |

TABLE 6

Coconut meat based composition with Carrot flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Grated and steamed carrot | 50-100 | |
| Coconut water | 500-1500 | 8-10% |

TABLE 7

Coconut meat based composition with Squash flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Grated and steamed squash | 200-250 | |
| Coconut water | 500-1500 | 8-10% |

TABLE 8

Coconut meat based composition with Sweet Potato flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Steamed sweet potato | 200-250 | |
| Coconut water | 500-1500 | 8-10% |

TABLE 9

Coconut meat based composition with Basil & Oregano flavors

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Basil & Oregano powder | 30-60 | |
| Coconut water | 500-1500 | 8-10% |

TABLE 10

Coconut meat based composition with Purple Yam flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Steamed purple yam | 200-250 | |
| Coconut water | 500-1500 | 8-10% |

TABLE 11

Coconut meat based composition with Green Tea flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Green tea powder/extract | 30 | |
| Coconut water | 500-1500 | 8-10% |

TABLE 12

Coconut meat based composition with Mango Tea flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Mango tea powder/extract | 30 | |
| Coconut water | 500-1500 | 8-10% |

TABLE 13

Coconut meat based composition with Turmeric flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Turmeric powder | 50-100 | |
| Coconut water | 500-1500 | 8-10% |

TABLE 14

Coconut meat based composition with Cinnamon flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Cinnamon powder | 40-80 | |
| Coconut water | 500-1500 | 8-10% |

TABLE 15

Coconut meat based compositin with Lemon Grass flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Lemon grass extract | 200-300 | |
| Coconut water | 500-1250 | 8-10% |

TABLE 16

Coconut meat based composition with Macapuno flavor

| Ingredients | Weight in grams (wet film) | Percent by weight (resulting dry film) |
|---|---|---|
| Fresh & young coconut meat | 13,250 | at least 90% |
| Virgin coconut oil | 10-15 | |
| Mango polyphenolic extract | 0.5-2 | |
| Macapuno | 50-100 | |
| Coconut water | 500-1250 | 8-10% |

The invention claimed is:

1. A method of preparing dehydrated coconut meat based edible film comprising the steps of:
   (a) preparing a coconut meat puree or batter formulation by mixing and blending fresh and young coconut meat with young coconut water and raw unrefined virgin coconut oil,
   (b) sieving the said mixture in step (a) using 100-200 mesh screen to achieve a homogeneous puree or batter,
   (c) spreading the resulting sieved mixture in a drying sheet with stainless steel template with desired dimensions,
   (d) drying the spread mixture up to a moisture content ranging from about 8 wt. % to about 10 wt. %,
   (e) cooling down the films to a temperature range of about 18° C. to 24° C. for about 5-10 minutes, characterized in that:
   (a') the young coconut water is filtered in a 3-stage microfiltration system with 0.10-5 microns of microfilter to disinfect and eliminate undesirable particulates;
   (b') the young coconut meat is chopped and immediately blended with the filtered young coconut water to obtain a coconut meat puree or subjected to a blast-freezer or contact-freezer to prevent the onset of natural fermentation before the chopping and blending steps;
   (c') the drying process is carried out for about 4.5 to 5 hours, in stages wherein the stages consist of the following:
   i) First stage: drying at 80-85° C. for about 30 minutes to one hour,
   ii) Second stage: drying at 70-80° C. for about 30 minutes to one hour,
   iii) Third stage: drying at 60-70° C. for about 30 minutes and then reshuffle and rotate the drying sheets and continue to dry for another 30 minutes,
   iv) Fourth stage: drying at 50-60° C. for about 30 minutes to one hour,
   v) Fifth stage: drying at 45-50° C. for about 30 minutes to one hour with a warm chamber wherein a dehumidifier is provided to hasten drying process and keep the finished product raw;
   wherein the edible film comprises:
   at least 88% coconut meat derived from fresh and young coconut;
   or less 12% of filtered fresh and young coconut water; and
   a raw unrefined virgin coconut oil in the range of 1.0% to 5.0% is added based on a sum of the coconut meat and the coconut water as 100% by weight basis; and
   wherein the edible film has
   a thickness in the range of 1.0 millimeter to about 3.0 millimeter;
   a water activity in a range of about 0.45 to about 0.55; and
   a moisture content in a range of 8% to 10%.

2. The method according to claim 1 wherein the coconut meat puree is further blended with vegetables, herbs and spices selected from turmeric powder, Moringa oleifera leaf powder, cinnamon powder, cacao powder, lemon grass extract, and mango polyphenolic extract.

3. The method according to claim 1 wherein the blending process is done at five thousand (5,000) revolutions per minute (rpm) for six (6) to eight (8) minutes and the stainless steel template has an outer dimension of about 16 inches by 24.5 inches and inner dimension of the molding at about 20 cm×20 cm wherein the stainless steel template can be further modified to 25 cm×25 cm, 28 cm×28 cm or 40 cm×40 cm.

4. The method according to claim 1, wherein the dehydrated coconut meat based edible film has a thickness ranging from about 1.5 mm to about 3.0 mm; a moisture content ranging from about 8 wt. % to about 10 wt. %; and a water activity of about 0.45 to about 0.55.

5. The method according to claim 1 wherein the raw ingredients used are derived from fresh and young coconuts that are organic which further comprise
   at least 1.0 to 5.0% raw unrefined virgin coconut oil;
   at least 0.05% mango polyphenolic extract; and
   at least 2% to at most 4% other ingredients selected from turmeric powder, Moringa oliefera leaf powder, cinnamon powder, cacao powder, lemon grass extract, purple yam and sweet potato, orange sweet potato, onion powder and garlic powder
as flavor enhancer, natural color source, and nutritional content and shelf-life enhancers.

* * * * *